United States Patent Office 3,020,260

Patented Feb. 6, 1962

1

3,020,260

ORGANOSILOXANE POTTING COMPOUND

Melvin E. Nelson, Midland, Mich., assignor to Dow Corning Corporation, Midland, Mich., a corporation of Michigan No Drawing. Filed Aug. 18, 1960, Ser. No. 50,333

13 Claims. (Cl. 260—46.5)

The present invention relates to organosiloxane potting compounds having unique non-flowing but self-healing properties, methods for the preparation thereof, and electrical apparatus potted or encapsulated therein. This application is a continuation-in-part of my copending application Serial No. 745,270 filed June 30, 1958, and now abandoned.

A wide variety of materials have been used in the past for the so-called "potting," "filling" or "encapsulating" of electrical assemblies. Such materials have ranged from fluids to resinous or rubbery products in form, and are used to provide electrical insulation along with varying degrees of protection from thermal or mechanical abuse. Materials used in this manner in the past have generally not permitted visual inspection of the embedded apparatus, and except where they were actually fluids and hence subject to leakage from their container, they did not permit the electrical testing of components of the apparatus without rupture of the potting compound itself.

It is an object of this invention to provide a potting compound having optical clarity, a fluid nature prior to cure and a soft, tacky, non-friable, jelly-like consistency after being cured. A further object is to provide a material which, although non-flowing in the sense that it will not flow from a container, is self-healing to the withdrawal of a probe, and which has good dielectric properties as well as moisture and thermal resistance.

The above objects have been attained by the organosiloxane gel of the present invention, which can be defined as the reaction product of an intimate mixture consisting essentially of (1) an organosiloxane having a viscosity of from 100 to 10,000 cs. at 25° C. and being a copolymer consisting essentially of units of the formula $RViSiO$, $R_2SiO$, and $CH_3R_2SiO_{.5}$ where each R individually is selected from the group consisting of methyl and phenyl radicals and Vi represents a vinyl radical, at least 0.174 molar percent of the units in said copolymer being the said $RViSiO$ units, (2) a liquid hydrogenosiloxane of the average general formula $$HRCH_3SiO(R_2SiO)_nSiCH_3RH$$

where each R is as above defined and $n$ has an average value such that the viscosity of the hydrogenosiloxane is no more than 10,000 cs. at 25° C., no more than 25 molar percent of the total R radicals present in (1) and (2) being phenyl, and (3) a platinum catalyst in an amount sufficient to furnish at least 0.1 part per million of Pt based on the combined weight of (1) and (2); the proportions of (1) and (2) being such that prior to reaction there is an average of from 1.4 to 1.8 gram atoms of the silicon-bonded H atoms in (2) per gram molecular weight of (1) and there being at least one $RViSiO$ unit in (1) for every silicon-bonded H atom in (2), the molecular weight of (1) being calculated by the equation:

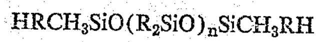

$$\log \text{visc.} = 1.00 + 0.0123M^{.5}$$

where M is the molecular weight and "visc." is the viscosity of (1) in cs. at 25° C.

The reaction which takes place when the above defined materials stand in intimate contact with one another does not evolve gaseous by-products, and hence there are no voids in the gelled reaction product. The final product is a true gel, for it is insoluble in the common organic solvents. It is a rare combination of cohesive strength, adhesive properties, elasticity, and non-fluidity which renders its completely non-flowing in respect to the container in which it has been gelled, and which permits deformation under slight pressure A probe can be inserted into or through the gel with great ease, so that electrical measurements can be taken upon any components which have been encapsulated therein. When such a probe is removed, the "self-healing" character of the gel is such that there is an immediate "flow" into the space formerly occupied by the probe, and there is no evidence of any rupture in the gel.

The combination of non-fluidity (in the one sense) with a self-healing type of flow, along with complete optical clarity and dielectric properties, makes the material eminently suitable for the filling, potting, encapsulating, or impregnating of electronic assemblies, capacitors, condensers, magnetic devices, or any other desired electrical apparatus.

The organosiloxane copolymers defined as constituent (1) above are well-known materials. They can be prepared, for example, by the cohydrolysis and cocondensation of the corresponding halosilanes, i.e. $RViSiCl_2$ $R_2SiCl_2$, and $CH_3R_2SiCl$, or by the copolymerization and equilibration of the corresponding siloxanes. Thus, for example, siloxanes of the formulas $(RViSiO)_4$, $(R_2SiO)_4$, and $(CH_3R_2Si)_2O$ can be mixed in appropriate ratios and heated at 150 to 160° C. in the presence of a catalyst such as NaOH, KOH, or LiOH until an equilibrium is established, then the copolymer neutralized with $CH_3R_2SiCl$. It is preferred that the copolymer used in this invention be substantially free of silicon-bonded hydroxy groups.

The R radicals in the defined copolymer can be the same or different radicals in each polymeric unit or in the molecule. Thus the copolymer can contain the units $MeViSiO$ and $PhViSiO$; $Me_2SiO$, $Ph_2SiO$, and $PhMeSiO$; and $Me_3SiO_{.5}$, $MePh_2SiO_{.5}$, and $Me_2PhSiO_{.5}$ in any combination so long as a representative of each type is present and so long as the viscosity and vinyl content requirements are met and the phenyl content does not exceed 25 molar percent. The symbols Me, Ph and Vi are used here and throughout this specification as representative of methyl, phenyl, and vinyl radicals respectively.

The copolymer (1) should have a viscosity of from 100 to 10,000 cs. at 25° C. This is of course controlled by the amount of the endblocking $CH_3R_2SiO_{.5}$ units present. Preferably this copolymer is substantially free of volatile low molecular weight species. As is well known, however, material of any particular viscosity will itself be composed of innumerable species of molecules having different molecular weights, and it is the viscosity of the mixture of species which is important here. Viscosities of from about 400 to 5000 cs. are preferred.

The hydrogenosiloxane (2) employed herein has the average general formula $HRMeSiO(R_2SiO)_nSiMeRH$, where each R is methyl or phenyl and $n$ is 0 or any positive integer or fraction so long as the viscosity does not exceed 10,000 cs. at 25° C. Thus $n$ can vary from 0 to about 800 inclusive, the upper limit of course varying with the type of R radicals present. Viscosities in the range of from 2 to 2,000 cs. are most preferred. The R radicals in a given molecule or in a given mixture of molecular species falling within this definition can be the same or different radicals. Thus the endblocking units can be $HMe_2SiO_{.5}$ units and/or $HMePhSiO_{.5}$ units, the repeating units if present can be $Me_2SiO$ and/or $MePhSiO$ and/or $Ph_2SiO$ units, and any combination of these endblocking and repeating units can be used. However, when phenyl radicals are present in either constituent (1) or constituent (2) as defined herein, the total number of such phenyl radicals should not exceed 25 molar percent of the total R radicals present in (1) plus (2), with a preferred maximum being about 10 molar percent. It is also preferred that the hydrogenosiloxane be substantially free of silicon-bonded hydroxy groups.

The defined hydrogenosiloxanes are known compounds and can be prepared, e.g., by the cohydrolysis and cocondensation of the corresponding chlorosilanes (i.e. MeRSiHCl and $R_2SiCl_2$) or by the acid catalyzed equilibration of the siloxanes $(MeRHSi)_2O$ and $(R_2SiO)_4$.

The most important factor in the production of the gel of this invention is in the control of the proportions of the siloxanes (1) and (2) employed. The proportions are such that prior to reaction there is an average of from 1.4 to 1.8 inclusive (preferably 1.45 to 1.7) of the silicon-bonded H atoms in (2) per molecule of (1), with there being at least one RViSiO unit in (1) for each such H atom, when the molecular weight of (1) has been calculated by the equation:

$$\log \text{visc. (cs. at } 25^\circ \text{ C.)} = 1.00 + 0.0123\ M^{.5}$$

The unique properties of the gel of this invention are not obtained when proportions outside of this definition are employed. The amount of "SiH" present in (2) is preferably determined by the known analytical methods for such determinations, although it too can be calculated from the viscosity of (2).

It can be seen that the weight ratios of (1) and (2) are thus subject to extremely wide variations, for they are dependent entirely upon the molecular weight of the one and the SiH content of the other. The equation used for determining the molecular weight of (1) gives a "number average" molecular weight, and has been shown by A. J. Barry to be reasonably valid for linear methylpolysiloxane fluids having molecular weights above 2500 (Journal of Applied Physics, vol. 17, 1020–1024, December 1946). Of course, the expression may not be exactly accurate, particularly when phenyl radicals or a relatively large amount of vinyl radicals are present. Nevertheless the calculation of molecular weight in this manner when used in conjunction with the defined limitations does express the proportions of (1) and (2) required for the desired results.

The required range of 1.4 to 1.8 SiH in (2) per molecule of (1) holds true regardless of the vinyl content of (1) so long as there is at least one RViSiO unit for each SiH. Thus no maximum limit of RViSiO content need be set, for an excess of vinyl radicals over silicon-bonded H atoms does not affect the peculiar non-flowing but self-healing characteristics of the gel. The thermal resistance of the gel, however, is somewhat adversely affected by large excesses of vinyl content. Thus it is preferred that there be no more than 5 molar percent of the RViSiO units present in the copolymer (1). For optimum properties in general it is also preferred that substantially all of the R radicals in both (1) and (2) be methyl radicals.

The gels of this invention are formed when the defined proportions of (1) and (2) are intimately mixed with a platinum catalyst and allowed to react. Many types of platinum catalysts for the SiH addition reaction to silicon-bonded vinyl radicals are known, ranging from platinum as such or as deposited on carriers such as silica gel or powdered charcoal, to platinic chloride, chloroplatinic acid, and salts of platinum. Any of such catalysts can be used in bringing about the reaction of the siloxanes (1) and (2) to form the unique gels of this invention. When optical clarity is an important factor, however, it is obvious that platinum in forms such as platinum black or platinized carbon or silica should be avoided. Thus the preferred forms of catalyst are as platinic chloride, platinum sulfate, salts of chloroplatinous acid such as $K_2PtCl_4$ and $Na_2PtCl_4$, and chloroplatinic acid. The latter is the most potent form known, and hence is most preferred because at a given temperature a maximum reaction rate at a minimum concentration is obtained.

Chloroplatinic acid is most economically obtained as the hexahydrate, $H_2PtCl_6.6H_2O$, and this is the preferred form in this invention, although the dehydrated form is operative. It is important that the catalyst be intimately dispersed in the mixture, thus when the catalyst is one which is soluble in an inert solvent it is preferred to employ a solution of the catalyst as an aid to easy dispersion. Chloroplatinic acid is soluble in a number of organic solvents, e.g. glycols and esters, of which dimethyl phthalate and dimethyl carbitol are preferred examples.

The reaction between siloxanes (1) and (2) can take place at room temperature, or even below so long as the fluids remain in a liquid state. The reaction rate will of course vary with the type and concentration of catalyst present, as well as with the temperature of the system. For example, with chloroplatinic acid as the catalyst in an amount to provide from 3 to 5 parts per million Pt based on the combined weight of (1) and (2), the gel stage will be reached in from 2 to 6 days at about 25° C. Ordinarily it will be preferred to expedite the reaction by heating the mixture after it has been placed in position, and for a maximum reaction rate coupled with a minimum degree of expansion of the final gel it is preferred to heat the mixture at 125 to 165° C. At 3 to 5 p.p.m. of Pt furnished by chloroplatinic acid, the desired gel is obtained in less than one hour at 150° C. Since optimum physical properties are obtained by heat curing the gel after it has formed, it is most preferred to heat the system for about 8 hours at 125 to 150° C.

There should be at least 0.1 part per million of Pt present in the mixture, but for more practical rates of reaction it is preferred to use a minimum amount of 0.5 part per million. Since impurities in the system may stop the effective action of such trace amounts of catalyst, however, it is best to use in the range of 3 to 7 p.p.m. of Pt. An excess of catalyst does not affect the reaction adversely, so no particular maximum need be specified. However, for maximum optical clarity it is preferred to use a maximum of about 25 p.p.m. Pt, even when a soluble catalyst such as chloroplatinic acid is the source. Economical considerations will of course suggest the use of small amounts of catalyst regardless of whether a particular use of the gel requires optical clarity.

When chloroplatinic acid is the catalyst being used, it is best for purposes of shipping and storing the material to mix the desired amount of catalyst in the vinyl-containing copolymer (1). Such a mixture is then diluted with the required amount of (2) just prior to using the final blend. It is not desirable to mix this particular catalyst with the SiH containing siloxane (2) when the latter is to stand for a considerable time prior to use, for water may get into the system and cause a slow conversion of the SiH to SiOH groups.

Conventional techniques for potting, filling, or encapsulating electrical apparatus can be used with the material defined herein. After the defined mixture has been prepared, it can be positioned by pouring, dipping, spraying or any other suitable method. The mixture is then merely maintained in position, i.e. in contact with the apparatus in question, and either heated or allowed to stand until the mixture has reacted to form the desired gel. Paper which has been impregnated with the unreacted components can be used as insulation for electrical cables and capacitors, and is characterized by the low dissipation factor obtainable thereby. Impregnation of the paper for such uses can be carried out either before or after the paper has been placed in position in the particular assembly. In order to avoid problems from gelation of any unused material in a dipping bath or other reservoir of the treating mixture, it is often desirable to use the components of the mixture in separate baths. For example, paper (or other fibrous insulation, or a wrapped assembly) can be impregnated first with the hydrogenosiloxane (2) and then with a mixture of the vinyl-containing siloxane (1) and platinum catalyst (3), thus allowing the gel-producing mixture of the invention to form within the treated article. Another important use of the defined gel-forming mixture lies in its application at junction surfaces and the like in transistors, rectifiers, diodes, or other electronic equipment affected by surface contamination. Application in this manner brings about desirable improvements in breakdown voltage and reverse current effects.

In addition to the gels which have been described above, this invention is also concerned with two particular modifications of the defined reaction products. Both modifications provide gels which have a "freezing" point (i.e., stiffening point) as much as 25° to 35° C. lower than that generally obtainable from the gels described above, without losing other desirable properties.

In the first modification, the organosiloxane (1) contains up to and including 10 molar percent $R'CH_3SiO$ units, where R' represents ethyl or $CF_3CH_2CH_2$— radicals or both, along with the previously defined RViSiO, $R_2SiO$, and $CH_3R_2SiO_{.5}$ units. The incorporation of the said $R'CH_3SiO$ units is particularly effective when most or all of the R radicals in the $R_2SiO$ units are methyl. It has also been found that much the same effect can be attained when no more than about 10 mol percent of the total copolymer units are $(C_6H_5)CH_3SiO$ units and the remainder of the $R_2SiO$ units are $(CH_3)_2SiO$ units. All or any part of the $R'CH_3SiO$ units in the copolymer can thus be replaced by $(C_6H_5)CH_3SiO$ units. In view of the above factors, the preferred species of organosiloxane (1) in this modification of the invention can be said to consist essentially of MeViSiO, $Me_2SiO$, $Me_3SiO_{.5}$, and R''MeSiO units, where R'' is a phenyl, ethyl, or $CF_3CH_2CH_2$— radical, there being no more than 10 mol percent of the said R''MeSiO units present. It is most preferred that there be only up to about 8 molar percent of the R''MeSiO units present, and the best results are seen at 3 to 7.5 molar percent of said units when R'' is phenyl or 1 to 5 molar percent when R'' is ethyl or trifluoropropyl. When any portion of the R'' radicals in the copolymer are phenyl, the previously expressed restriction on total phenyl content still applies, i.e., no more than 25 molar percent of the total of R and R'' radicals in (1) plus R radicals in (2) should be phenyl.

In the second particular modification of the gels of this invention, the previously defined vinyl-containing organosiloxane (1), hydrogenosiloxane (2), and platinum catalyst (3) are reacted by contacting them in liquid phase and in intimate mixture with (4) a silicone fluid diluent. In order to obtain a depressed freezing point effect without disrupting other beneficial properties, this diluent preferably has a viscosity of from 20 to 1,000 cs. at 25° C., is used in an amount of no more than 23 percent by weight based on the total weight of (1)+(2)+(3)+(4), and takes the form of either (A) methylsiloxane copolymers consisting essentially of from 1 to 7 molar percent $MeSiO_{1.5}$, from 1 to 8 molar percent $Me_3SiO_{.5}$ and from 85–98 molar percent $Me_2SiO$ units, or (B) organosiloxane copolymers consisting essentially of from 75 to 98.5 molar percent $Me_2SiO$, from 1 to 10 molar percent $R^3MeSiO$, from 0.5 to 8 molar percent $(R^4)_2MeSiO_{.5}$, and from 0 to 7 molar percent $R^4SiO_{1.5}$ units, where Me is a methyl radical, $R^3$ is selected from the group consisting of ethyl, phenyl, and $CF_3CH_2CH_2$— radicals, and $R^4$ is selected from the group consisting of methyl, ethyl, phenyl, and $CF_3CH_2CH_2$— radicals; the above stated ranges all being inclusive.

The most preferred form of silicone diluent (4) is one which has a viscosity of from 40 to 100 cs. at 25° C. and which is a copolymeric methylsiloxane consisting essentially of from 2 to 4 molar percent $MeSiO_{1.5}$, from 2 to 5 molar percent $Me_3SiO_{.5}$, and from 91 to 96 molar percent $Me_2SiO$ units. It is also ordinarily preferred that the silicone diluent (4) be used in an amount of from about 6 to 10 percent by weight based on the total weight of all of the components in the system. Since harder gels are obtained as the relative amount of SiH-containing fluid (2) is raised, the higher concentrations of diluent (4) will usually be desirable only when the upper limit of 1.8 silicon bonded H atoms per molecule of (1) is being approached. The plasticizing effect of diluent (4) will even permit the aforesaid ratio of 1.8 SiH per molecule of (1) to be exceeded, so long as the stiffness of the gel is offset by additional diluent.

It is preferred that the diluent (4) employed be one which is completely compatible with the mixture of (1) and (2), although this is not essential if the diluent is kept intimately mixed until gelation has taken place. It is also preferred that the diluent be substantially free of uncondensed silicon-bonded hydroxy groups.

It is to be understood that the reaction of the previously described components (1), (2), and (3) can take place in diluents other than silicone fluids (for example, inert organic solvents such as benzene, toluene, xylene, petroleum ethers, and the like) or in silicone fluids other than those which have been specifically defined above (particularly, fluids such as the dimethylpolysiloxanes). The invention in its broadest form includes reaction products and methods in which such other diluents may have been employed. As noted before, however, it is the defined silicone diluents (4) which provide very special properties in the product gel.

In the above described "second modification" of this invention, the use of the silicone diluent (4) makes it unnecessary to incorporate the $R'CH_3SiO$ or $R''CH_3SiO$ units into the copolymer (1), for a depressed freezing point can be obtained without modifying copolymer (1). The presence of the said $R'CH_3SiO$ or $R''CH_3SiO$ units in (1) in conjunction with the use of diluent (4) does no harm, however, and may even be beneficial, particularly when (1) is limited to no more than about 5 molar percent of said units. In any regard, the presence of these units in copolymer (1) is purely optional, and the copolymer (1) is thus preferably defined as containing from 0 to 5 molar percent of the units in question when diluent (4) is employed.

When it is desired to incorporate the $R'CH_3SiO$ or $R''CH_3SiO$ units into the copolymeric organosiloxane reactant (1), the previouly described preparations only need to be modified to the extent of incorporating the appropriate chlorosilanes or siloxanes into the cohydrolysis or copolymerization and equilibration steps. The defined silicone fluid diluents (4) are well known types of products, and can be prepared by the cohydrolysis and cocondensation of the corresponding chlorosilanes or by the copolymerization and equilibration of the corresponding siloxanes. In the (4) (B) diluent which has been described above, the presence of the mono-organosiloxane units $R^4SiO_{1.5}$ is purely optional, and thus they are defined as being present at from 0 to 7 molar percent.

When the reaction of (1), (2), and (3) is carried out in the presence of the silicone diluent (4) as described above, the diluent molecules apparently become entrapped within the gel structure which is formed and thus have a plasticizing effect upon the product. Under the stated limitations the plasticizing effect does not materially change the properties of the gel except for the desired lowering of the freezing point.

The following examples are illustrative only. All parts and percentages are by weight unless otherwise specified.

*Example 1*

A series of mixtures was prepared, each containing a particular copolymer of $Me_2SiO$, MeViSiO, and $Me_3SiO_{.5}$ units, and a particular hydrogenosiloxane of the formula $Me_2HSiO(Me_2SiO)_nSiMe_2H$. A solution of $H_2PtCl_6.6H_2O$ in dimethyl phthalate was added to each mixture in an amount to provide about 4 parts per million Pt based on the combined weights of the two siloxanes in each mixture. Samples of each mixture were then heated at 150° C. for 1 hour, and properties of the resulting gels were determined.

The types and amounts of siloxanes in each mixture are shown in Table I below. The copolymer containing MeViSiO units is designated fluid (1), and that which contained the silicon-bonded H atoms is designated fluid (2). For purposes of comparison, mixtures both within and outside of the scope of this invention are included in the table. Those gels which had the necessary degree of softness, tackiness, elasticity, and cohesiveness to be non-flowing and yet self-healing as defined above are labeled "good." Gels which were too soft or too hard to meet these requirements are labeled accordingly.

In the table, the viscosity of both fluids in cs. at 25° C. is listed under "visc." Under fluid (1), the molecular weight of that fluid was calculated from the expression: $[(\log \text{visc.}-1.0)/0.0123]^2$. The "pct. Vi" expresses the molar percent of MeViSiO units present in fluid (1), and the "Si/mol (1)" shows the approximate average number of Si atoms (i.e. polymer units) per molecule of fluid (1). Since the amount of MeViSiO units present was relatively small, the Si/mol (1) value was approximated by merely dividing the molecular weight by 74, the unit weight of $Me_2SiO$.

Under fluid (2), "wt. pct." expresses the percent of that fluid in the combined fluids, e.g. a value of 2.7 means 2.7 parts of fluid (2) per 97.3 parts of fluid (1). The percent of silicon-bonded H atoms is designated "pct. SiH" and was determined as a weight percent of fluid (2) by direct analytical methods.

The controlling ratio in delimiting the desired types of gels, as has been noted previously, is the ratio of silicon-bonded H atoms in (2) per molecule of (1). This ratio is shown under "SiH/mol (1)" in the table. It is calculated directly from the percent of fluid (2) present, the percent silicon-bonded H in that fluid, the molecular weight of (1), and the percent of (1) present. Thus in mix No. 1, the value would be calculated:

$$0.027 \times 0.00248 \times 22{,}800/0.973 = 1.57$$

1, containing the same amount of Pt added as chloroplatinic acid, was allowed to stand at room temperature for six days. A satisfactory non-flowing, self-healing gel was obtained.

*Example 4*

A mixture was prepared of 97.3 parts of a copolymer of $Me_2SiO$, MeViSiO, and $Me_3SiO_{.5}$ units, having a viscosity of 700 cs. at 25° C. and a MeViSiO content of 10 molar percent, with 2.7 parts of the fluid (2) used in mix No. 1 of Example 1, giving a ratio of about 1.55 silicon-bonded H per molecule of (2). A quantity of chloroplatinic acid sufficient to provide 10 p.p.m. Pt was thoroughly dispersed in the mixture, then it was heated at 150° C. for one hour. A satisfactory gel was obtained although it was less thermally stable than that of mix No. 1 in Example 1.

*Example 5*

When mix No. 1 of Example 1 is duplicated, but using 20 p.p.m. Pt catalyst added as $K_2PtCl_4$, as platinic chloride, or as Pt deposited on charcoal, heating the mixtures at 150° C. produces non-flowing self-healing gels, although they are of poor optical quality.

*Example 6*

When a mixture is prepared containing 99.5 parts of a copolymer of $Me_2SiO$, MeViSiO, and $Me_3SiO_{.5}$ units (having a viscosity of 4,000 cs. at 25° C. and a MeViSiO content of 0.5 molar percent) and 0.5 part of $$(PhMeHSi)_2O$$

the "SiH/mol (1)" ratio is about 1.74. Heating this mixture at 150° C. after dispersing 5 p.p.m. Pt (added as chloroplatinic acid) therein provides a satisfactory non-flowing self-healing gel.

TABLE I

| Mix No. | Fluid (1) | | | | Fluid (2) | | | Ratios | | | Gel Quality |
|---|---|---|---|---|---|---|---|---|---|---|---|
| | Visc. | Mol. Wt. | Pct. Vi | Si/Mol (1) | Wt. Pct. | Pct. SiH | Visc. | SiH/Mol (1) | SiH/Si (1) | SiH/Vi | |
| 1 | 720 | 22,800 | 1.0 | 308 | 2.70 | 0.248 | 4.6 | 1.57 | 0.0051 | 0.51 | Good. |
| 2 | 680 | 22,200 | 1.0 | 300 | 2.70 | 0.248 | 4.6 | 1.53 | .0051 | .51 | Do. |
| 3 | 487 | 18,820 | 2.0 | 255 | 3.40 | 0.248 | 4.6 | 1.65 | .0066 | .33 | Do. |
| 4 | 620 | 21,300 | 0.75 | 288 | 3.20 | 0.248 | 4.6 | 1.75 | .0061 | .81 | Do. |
| 5 | 4,490 | 46,300 | 2.0 | 627 | 1.37 | 0.248 | 4.6 | 1.59 | .0025 | .13 | Do. |
| 6 | 4,000 | 44,700 | 0.3 | 603 | 1.30 | 0.248 | 4.6 | 1.46 | .0024 | .8 | Do. |
| 7 | 4,000 | 44,700 | 1.0 | 603 | 1.30 | 0.248 | 4.6 | 1.46 | .0024 | .24 | Do. |
| 8 | 720 | 22,800 | 1.0 | 308 | 36.03 | 0.0127 | 1,018 | 1.63 | .0053 | .53 | Do. |
| 9 | 680 | 22,200 | 1.0 | 300 | 4.76 | 0.139 | 40.6 | 1.55 | .0051 | .51 | Do. |
| 10 | 720 | 22,800 | 1.0 | 308 | 2.26 | 0.248 | 4.6 | 1.31 | .0042 | .42 | Soft. |
| 11 | 720 | 22,800 | 1.0 | 308 | 2.80 | 0.248 | 4.6 | 1.63 | .0053 | .53 | Good. |
| 12 | 720 | 22,800 | 1.0 | 308 | 3.34 | 0.248 | 4.6 | 1.96 | .0063 | .63 | Hard. |
| 13 | 487 | 18,820 | 2.0 | 255 | 2.80 | 0.248 | 4.6 | 1.35 | .0053 | .26 | Soft. |
| 14 | 487 | 18,820 | 2.0 | 255 | 3.47 | 0.248 | 4.6 | 1.68 | .0066 | .33 | Good. |
| 15 | 487 | 18,820 | 2.0 | 255 | 4.13 | 0.248 | 4.6 | 2.10 | .0079 | .39 | Hard. |
| 16 | 4,490 | 46,300 | 2.0 | 627 | 1.37 | 0.248 | 4.6 | 1.59 | .0025 | .13 | Good. |
| 17 | 4,490 | 46,300 | 2.0 | 627 | 1.10 | 0.248 | 4.6 | 1.28 | .0020 | .10 | Soft. |
| 18 | 4,490 | 46,300 | 2.0 | 627 | 1.47 | 0.248 | 4.6 | 1.72 | .0027 | .14 | Good. |

It will be seen from the above table that factors such as the weight percent of fluid (2) present, the viscosities of the fluids, or differences in the SiH or vinyl content do not in themselves control the nature of the reaction product. This is also true of the ratio between "SiH/mol (1)" and "Si/mol (1)" [shown as "SiH/Si (1)" in the table], and between "SiH/Si (1)" and "pct. Vi" [shown as "SiH/Vi" in the table].

*Example 2*

Mixtures identical to mix No. 1 in Example 1 were prepared, except that the chloroplatinic acid was added in quantities varying from 0.6 to 21.4 parts per million Pt based on the combined weight of fluids (1) and (2). These mixtures all gelled satisfactorily in one hour at 150° C., although that containing 21.4 p.p.m. Pt was not as optically clear as those containing smaller amounts.

*Example 3*

A mixture identical to that of mix No. 1 in Example

*Example 7*

Copolymers were prepared containing $Me_3SiO_{.5}$, $Me_2SiO$, MeViSiO, and either PhMeSiO or $Ph_2SiO$ units respectively. Each contained 1 molar percent of the MeViSiO units and 2 molar percent of the particular phenyl substituted unit, and each had a viscosity of about 700 cs. When 97.3 parts of either of these fluid copolymers is mixed with 2.7 parts of the fluid containing 0.248% H from Example 1 and 5 p.p.m. Pt added as chloroplatinic acid, heating the mixture for one hour at 150° C. gives a gel comparable to that obtained in Example 1, mix No. 1.

*Example 8*

A copolymer having a viscosity of about 4,000 cs. was prepared containing $Me_2SiO$ and $Me_3SiO_{.5}$ units along with 1 molar percent MeViSiO and 7.5 molar percent PhMeSiO units. When 98.7 parts of this copolymer is mixed with 1.3 parts of the fluid from Example 1 containing 0.248% H and 5 p.p.m. Pt added as chloroplatinic acid, heating the mixture for one hour at 150° C. gives a satisfactory gel having a freezing point below −75° C. as compared to freezing points of about −50° C. for the gels of Example 1.

*Example 9*

Two copolymers were prepared, each having a viscosity of about 700 cs. at 25° C. They were copolymers of $Me_2SiO$ and $Me_3SiO_{.5}$ units with 1 molar percent of MeViSiO units, along with 4 molar percent of MeEtSiO or $Me(CF_3CH_2CH_2)SiO$ units respectively. When either of these fluids are used in place of fluid (1) in mix No. 1 of Example 1, good gels are obtained having a freezing point below −60° C. Et, above and hereafter, represents ethyl.

*Example 10*

A copolymer (1) was prepared containing 98 molar percent $Me_2SiO$, 1 percent MeViSiO, and 1 percent $Me_3SiO_{.5}$ units and having a viscosity of 719 cs. at 25° C. A hydrogenosiloxane $Me_2HSiO(Me_2SiO)_nSiMe_2H$ (2) was prepared having a viscosity of 62 cs. at 25° C. and containing 0.113 percent silicon-bonded hydrogen. Another copolymer (4) was prepared containing about 92.8 molar percent $Me_2SiO$, 3.6 molar percent $MeSiO_{1.5}$, and 3.6 molar percent $Me_3SiO_{.5}$ units and having a viscosity of about 50 cs. The fluids were mixed in amount to provide 86.95 parts (1), 4.78 parts (2), and 8.27 parts (4), thus providing ratios of about 1.42 gram atoms of silicon-bonded H atoms per gram molecular weight of (1) and about 2 MeViSiO units in (1) per silicon-bonded H atom in (2). Chloroplatinic acid was added to the mixture in an amount to provide 2 parts per million Pt based on the combined weights of the siloxanes. A sample of the final mixture was heated at 150° C. for 1 hour, providing a satisfactory non-flowing but self-healing gel which had a freezing point below −75° C. A power transformer for a transistorized ignition system was potted with another portion of the final mixture, and the potted assembly was heated for about 1 hour at 150° C. The gel which was thus formed around the transformer was optically clear and had good dielectric properties as well as resistance to moisture, heat, and physical shock.

*Example 11*

A series of diluent fluids was prepared in which each fluid had a viscosity in the range of 100 to 1000 cs. One group consisted of $Me_2SiO$ copolymers containing 6 mol percent respectively of PhMeSiO, EtMeSiO, or $$(F_3CCH_2CH_2)MeSiO$$

units and 6 mol percent $Me_3SiO_{.5}$ units. Another group consisted of $Me_2SiO$ copolymers containing 2 mol percent EtMeSiO units and 3 mol percent of $Me_2PhSiO_{.5}$ or $Me_2(F_3CCH_2CH_2)SiO_{.5}$ units respectively. Another member of the series contained 3 mol percent $MeSiO_{1.5}$, 3 mol percent PhMeSiO, 5 mol percent $MeEt_2SiO$, and the remainder $Me_2SiO$ units. When any of these fluids are used in the formulation of Example 10 in place of the diluent (4) in that example, satisfactory gels are obtained.

That which is claimed is:

1. A soft, non-friable gel which is the reaction product of an intimate mixture consisting essentially of (1) an organosiloxane having a viscosity of from 100 to 10,000 cs. at 25° C. and being a copolymer consisting essentially of units of the formula RViSiO, $R_2SiO$, and $CH_3R_2SiO_{.5}$ where each R individually is selected from the group consisting of methyl and phenyl radicals and Vi represents a vinyl radical, at least 0.174 molar percent of the units in said copolymer being the said RViSiO units, (2) a liquid hydrogenosiloxane of the average general formula $HRCH_3SiO(R_2SiO)_nSiCH_3RH$ where each R is as above defined and $n$ has an average value such that the viscosity of the hydrogenosiloxane is no more than 10,000 cs. at 25° C., no more than 25 molar percent of the total R radicals present in (1) and (2) being phenyl, and (3) a platinum catalyst in an amount sufficient to furnish at least 0.1 part per million of Pt based on the combined weight of (1) and (2);

the proportions of (1) and (2) being such that prior to reaction there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation: log visc.$=1.00+0.0123\ M^{.5}$, where M is the molecular weight and "visc." is the viscosity of (1) in cs. at 25° C.

2. A gel as defined in claim 1 wherein the platinum catalyst is selected from the group consisting of chloroplatinic acid, platinic chloride, platinum sulfate, and metal salts of chloroplatinous acid.

3. A soft, tacky, non-friable, non-flowing, self-healing gel which is the reaction product of an intimate mixture consisting essentially of (1) an organosiloxane being substantially free of silicon-bonded hydroxy groups, having a viscosity of from 100 to 10,000 cs. at 25° C., and being a copolymer consisting essentially of units of the formula MeViSiO, $Me_2SiO$ and $Me_3SiO_{.5}$ where Me and Vi represent methyl and vinyl radicals respectively, there being from 0.174 to 5 inclusive molar percent of the MeViSiO units in said copolymer, (2) a liquid hydrogenosiloxane substantially free of silicon-bonded hydroxy groups and having the average general formula $HMe_2SiO(Me_2SiO)_nSiMe_2H$ where Me represents a methyl radical and $n$ has a value such that the viscosity of the hydrogenosiloxane is from 2 to 2,000 cs. at 25° C., and (3) chloroplatinic acid in an amount sufficient to provide from 0.5 to 25 parts per million of Pt based on the combined weight of (1) and (2);

the proportions of (1) and (2) being such that there is an average of from 1.45 to 1.7 gram atoms of the silicon-bonded H atoms in (2) per gram molecular weight of (1) and there being at least one MeViSiO unit in (1) for every silicon-bonded H atom in (2), the melocular weight of (1) being calculated by the equation: log. visc.$=1.00+0.0123\ M^{.5}$, where M is the molecular weight and "visc." is the viscosity of (1) in cs. at 25° C.

4. A method for encapsulating electrical apparatus which comprises preparing the mixture defined in claim 1, and maintaining the mixture in contact with said electrical apparatus until the mixture has reacted to form a soft, non-friable, non-flowing gel.

5. A method for the preparation of a soft, non-friable, non-flowing gel which comprises reacting, by contacting in a liquid phase, (1) an organosiloxane having a viscosity of from 100 to 10,000 cs. at 25° C. and being a copolymer consisting essentially of units of the formula RViSiO, $R_2SiO$, and $CH_3R_2SiO_{.5}$ where each R individually is selected from the group consisting of methyl and phenyl radicals and Vi represents a vinyl radical, at least 0.174 molar percent of the units in said copolymer being the said RViSiO units, with (2) a liquid hydrogenosiloxane of the average general formula $HRCH_3SiO(R_2SiO)_nSiCH_3RH$ where each R is as above defined and $n$ has an average value of from 0 to 800 inclusive, the viscosity of the hydrogenosiloxane being no more than 10,000 cs. at 25° C. and no more than 25 molar percent of the total R radicals present in (1) and (2) being phenyl, in the presence of (3) chloroplatinic acid in an amount sufficient to provide at least 0.1 part per million of Pt based on the combined weight of (1) and (2);

the proportions of (1) and (2) being such that there is an average of fro m1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation: log visc.$=1.00+0.0123$ $M^{.5}$, where M is the molecular weight and "visc." is the viscosity of (1) in cs. at 25° C.

6. A method in accordance with claim 5 wherein the organosiloxane (1) is a copolymer of MeViSiO, $Me_2SiO$ and $Me_3SiO_{.5}$ units, and wherein the hydrogenosiloxane has a viscosity of from 2 to 2,000 cs. at 25° C. and has the average general formula $HMe_2SiO(Me_2SiO)_nSiMe_2H$, Me and Vi representing methyl and vinyl radicals respectively.

7. A soft, non-friable gel which is the reaction product of an intimate mixture consisting essentially of (1) an organosiloxane having a viscosity of from 100 to 10,000 cs. at 25° C. and being a copolymer consisting essentially of units of the formula RViSiO, $R_2SiO$, $CH_3R_2SiO_{.5}$ and $R'CH_3SiO$, where each R individually is selected from the group consisting of methyl and phenyl radicals, Vi represents a vinyl radical, and R' is selected from the group consisting of ethyl and $CF_3CH_2CH_2$— radicals, there being no more than 10 molar percent of said $R'CH_3SiO$ units present and at least 0.174 molar percent of the units in said copolymer being the said RViSiO units, (2) a liquid hydrogenosiloxane of the average general formula $HRCH_3SiO(R_2SiO)_nSiCH_3RH$ where each R is as above defined and $n$ has an average value such that the viscosity of the hydrogenosiloxane is no more than 10,000 cs. at 25° C., no more than 25 molar percent of the total R radicals present in (1) and (2) being phenyl, and (3) a platinum catalyst in an amount sufficient to furnish at least 0.1 part per million of Pt based on the combined weight of (1) and (2);

the proportions of (1) and (2) being such that prior to reaction there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation: log visc.$=1.00+0.0123$ $M^{.5}$, where M is the molecular weight and "visc." is the viscosity of (1) in cs. at 25° C.

8. A gel as defined in claim 7 wherein the platinum catalyst is selected from the group consisting of chloroplatinic acid, platinic chloride, platinum sulfate, and metal salts of chloroplatinous acid.

9. A soft, tacky, non-friable, non-flowing, self-healing gel which is the reaction product of an intimate mixture consisting essentially of (1) an organosiloxane being substantially free of silicon-bonded hydroxy groups, having a viscosity of from 100 to 10,000 cs. at 25° C., and being a copolymer consisting essentially of units of the formula MeViSiO, $Me_2SiO$, and $Me_3SiO_{.5}$ copolymerized with up to 8 mol percent of units of the formula R"MeSiO where R" is selected from the group consisting of phenyl, ethyl, and $CF_3CH_2CH_2$— radicals, there being from 0.174 to 5 inclusive molar percent of the MeViSiO units in said copolymer, (2) a liquid hydrogenosiloxane substantially free of silicon-bonded hydroxy groups and having the average general formula $HMe_2SiO(Me_2SiO)_nSiMe_2H$ where Me represents a methyl radical and $n$ has a value such that the viscosity of the hydrogenosiloxane is from 2 to 2,000 cs. at 25° C., and (3) chloroplatinic acid in an amount sufficient to provide from 0.5 to 25 parts per million of Pt based on the combined weight of (1) and (2);

the proportions of (1) and (2) being such that there is an average of from 1.45 to 1.7 gram atoms of the silicon-bonded H atoms in (2) per gram molecular weight of (1) and there being at least one MeViSiO unit in (1) for every silicon-bonded H atom in (2), the molecular weight of (1) being calculated by the equation: log visc.$=1.00+0.0123$ $M^{.5}$, where M is the molecular weight and "visc." is the viscosity of (1) in cs. at 25° C.

10. A method for the preparation of a soft, non-friable, non-flowing gel which comprises reacting, by contacting in a liquid phase, (1) an organosiloxane having a viscosity of from 100 to 10,000 cs. at 25° C. and being a copolymer consisting essentially of units of the formula RViSiO, $R_2SiO$, $CH_3R_2SiO_{.5}$, and $R'CH_3SiO$, where each R individually is selected from the group consisting of methyl and phenyl radicals, R' is selected from the group consisting of ethyl and $CF_3CH_2CH_2$— radicals, and Vi represents a vinyl radical, there being no more than 10 molar percent of said $R'CH_3SiO$ units present and at least 0.174 molar percent of the units in said copolymer being the said RViSiO units, with (2) a liquid hydrogenosiloxane of the average general formula $HRCH_3SiO(R_2SiO)_nSiCH_3RH$ where each R is as above defined and $n$ has an average value of from 0 to 800 inclusive, the viscosity of the hydrogenosiloxane being no more than 10,000 cs. at 25° C. and no more than 25 molar percent of the total R radicals present in (1) and (2) being phenyl, in the presence of (3) chloroplatinic acid in an amount sufficient to provide at least 0.1 part per million of Pt based on the combined weight of (1) and (2);

the proportions of (1) and (2) being such that there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation:

$$\log \text{visc.}=1.00+0.0123\ M^{.5}$$

where M is the molecular weight and "visc." is the viscosity of (1) in cs. at 25° C.

11. A method in accordance with claim 10 wherein the organosiloxane (1) has a viscosity of from 400 to 5,000 cs. at 25° C. and is a copolymer of MeViSiO, $Me_2SiO$, $Me_3SiO_{.5}$, and up to 8 molar percent R"MeSiO units, R" being selected from the group consisting of phenyl, ethyl, and $CF_3CH_2CH_2$— radicals, and wherein the hydrogenosiloxane (2) has a viscosity of from 2 to 2,000 cs. at 25° C. and has the average general formula $HMe_2SiO(Me_2SiO)_nSiMe_2H$, Me and Vi in the above formulae representing methyl and vinyl radicals respectively.

12. A soft, non-friable gel which is the reaction product of the process which comprises reacting (1) an organosiloxane having a viscosity of from 100 to 10,000 cs. at 25° C. and being a copolymer consisting essentially of units of the formula RViSiO, $R_2SiO$, and $CH_3R_2SiO_{.5}$ copolymerized with from 0 to 5 molar percent $R'CH_3SiO$ units, where each R individually is selected from the group consisting of methyl and phenyl radicals, R' is selected from the group consisting of ethyl and $CF_3CH_2CH_2$— radicals, and Vi represents a vinyl radical, at least 0.174 molar percent of the units in said copolymer being the said RViSiO units, with (2) a liquid hydrogenosiloxane of the average general formula $HRCH_3SiO(R_2SiO)_nSiCH_3RH$ where each R is as above defined and $n$ has an average value of from 0 to 800 inclusive, the viscosity of the hydrogenosiloxane being no more than 10,000 cs. at 25° C. and no more than 25 molar percent of the total R radicals present in (1) and (2) being phenyl, in the presence of (3) a platinum catalyst in an amount sufficient to furnish at least 0.1 part per million of Pt based on the combined weight of (1) and (2), by contacting (1), (2), and (3) in liquid phase and in intimate mixture with (4) a silicone fluid diluent having a viscosity of from 20 to 1,000 cs. at 25° C. and selected from the group consisting of (A) methylsiloxane copolymers consisting essentially of from 1 to 7 molar percent $MeSiO_{1.5}$, from 1 to 8 molar percent $Me_3SiO_{.5}$ and from 85–98 molar percent $Me_2SiO$ units, and (B) organosiloxane copolymers consisting essentially of from 75 to 98.5 molar percent $Me_2SiO$, from 1 to 10 molar percent $R^3MeSiO$, from 0.5 to 8 molar percent $(R^4)_2MeSiO_{.5}$, and from 0 to 7 molar percent $R^4SiO_{1.5}$ units, where Me is a methyl radical, $R^3$ is selected from the group consisting of ethyl, phenyl, and $CF_3CH_2CH_2$— radicals, and $R^4$ is selected from the group consisting of methyl, ethyl, phenyl, and $CF_3CH_2CH_2$— radicals;

there being no more than 23 percent by weight (4) based on the total weight of (1)+(2)+(3)+(4), the proportions of (1) and (2) being such that there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation: log visc.$=1.00+0.0123M^{.5}$, where M is the molecular weight and "visc." is the viscosity of (1) in cs. at 25° C.

13. A soft, non-friable gel which is the reaction product of the process which comprises reacting (1) an organosiloxane having a viscosity of from 400 to 5,000 cs. at 25° C. and being a copolymer of MeViSiO, $Me_2SiO$, and $Me_3SiO_{.5}$ units, at least 0.174 molar percent of the units in said copolymer being the said MeViSiO units, with (2) a liquid hydrogenosiloxane of the average general formula $HMe_2SiO(Me_2SiO)_nSiMe_2H$, said hydrogenosiloxane having a viscosity of from 2 to 2,000 cs. at 25° C., in the presence of (3) chloroplatinic acid in an amount sufficient to provide at least 0.1 part per million of Pt based on the combined weight of (1) and (2), by contacting (1), (2), and (3) in liquid phase and in intimate mixture with (4) a copolymeric methylsiloxane diluent having a viscosity of from 40 to 100 cs. at 25° C. and consisting essentially of from 2 to 4 molar percent $MeSiO_{1.5}$, from 2 to 5 molar percent $Me_3SiO_{.5}$, and from 91 to 96 molar percent $Me_2SiO$ units;

the symbols Me and Vi in the above formulae representing methyl and vinyl radicals respectively, there being no more than 10 percent by weight (4) based on the total weight of (1)+(2)+(3)+(4), the proportions of (1) and (2) being such that there is an average of from 1.45 to 1.7 gram atoms of the silicon-bonded H atoms in (2) per gram molecular weight of (1) and there being at least one MeViSiO unit in (1) for every silicon-bonded H atom in (2), the molecular weight of (1) being calculated by the equation: log visc.$=1.00+0.0123M^{.5}$, where M is the molecular weight and "visc." is the viscosity of (1) in cs. at 25° C.

No references cited.

UNITED STATES PATENT OFFICE

CERTIFICATE OF CORRECTION

Patent No. 3,020,260 — February 6, 1962

Melvin E. Nelson

It is hereby certified that error appears in the above numbered patent requiring correction and that the said Letters Patent should read as corrected below.

Column 3, line 50, after "than" insert -- about --; column 14, line 7, for the formula "$HMe_2SiO(Me_2SiO)_nSiMe_3H$" read -- $HMe_2SiO(Me_2SiO)_nSiMe_2H$ --.

Signed and sealed this 7th day of August 1962.

(SEAL)
Attest:

ERNEST W. SWIDER
Attesting Officer

DAVID L. LADD
Commissioner of Patents